Dec. 5, 1961 W. GUITE 3,011,815
SEALING RING FOR A SHAFT
Filed Sept. 26, 1960

United States Patent Office 3,011,815
Patented Dec. 5, 1961

3,011,815
SEALING RING FOR A SHAFT
Wilfred Guite, Pendleton, Salford, England, assignor to Charles Weston & Co. Limited, Pendleton, Salford, England
Filed Sept. 26, 1960, Ser. No. 58,538
Claims priority, application Great Britain Jan. 19, 1960
5 Claims. (Cl. 288—5)

The invention relates to a sealing ring, for a shaft, of the kind in which a ring, of rubber or similar material and substantially of U cross-section, is axially split in one circumferential position and is bonded within a rigid annulus composed of complementary, contiguous, arcuate members having their adjacent ends slightly annularly spaced and having one of the said spaces coinciding with the axial split such that the, or each, other of the said spaces permits the intervening portion of rubber to be flexed so that the rigid members can be moved angularly for opening the split to an extent that it can be slipped transversely over the shaft to be sealed, the radially-inner flange of the U being convergent to provide a lip for establishing the seal with the shaft. It is found that with a seal of this kind there is a tendency for a gap to occur at the split in the radially-inner flange when the sealing ring is in position on a shaft such that leakage of oil or other fluid to be held back can pass through the gap. It is the object of the present invention to mitigate that disadvantage.

According to the invention the rubber ring is provided, at each side of the split and interiorly of the channel of the U, with an integral web connecting the extremity, at the split, of the radially-inner flange of the U to a portion of the radially-outer flange which is circumferentially spaced from the split, the two webs acting to urge the extremities of the radially-inner flange circumferentially into engagement with each other when the sealing ring is closed about the shaft.

According to a further feature each web is straight and is directed along a common notional chord of the radially-inner and radially-outer flanges.

According to yet another feature the rubber ring has the radially-inner and radially-outer flanges of the U interconnected in a plurality of circumferentially-spaced positions by integral webs acting to displace the lip of the radially-inner flange circumferentially towards the split from a diametrically-opposite point when the sealing ring is closed about the shaft.

The invention is illustrated, by way of example, in the accompanying drawings, in which.

Figure 1:
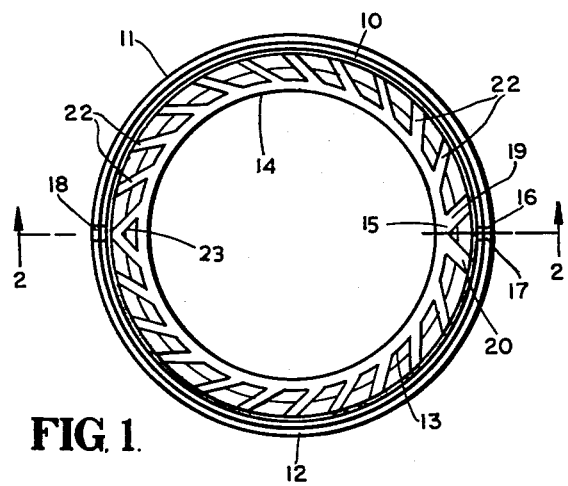
FIGURE 1 is an end elevation of one form of the sealing ring, the view being one looking into the channel of the rubber ring.
Figure 2:
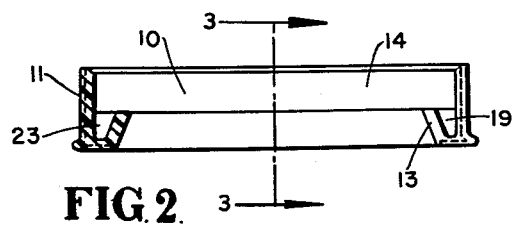
FIGURE 2 is a section on the line 2—2 of FIGURE 1.

The drawings show a rubber ring substantially of U cross-section and having its outer periphery 10 bonded to the inner surfaces of two substantially semi-cylindrical metal casing members 11, 12. The radially-inner flange of the rubber ring is shown at 13 and it will be seen that it terminates in a sealing edge 14. The rubber ring is axially split at 15 in a position mid-way between the adjacent one ends 16, 17 of the members 11 and 12, whereby the rubber in a space 18 between the opposite adjacent ends of those members can be flexed for allowing the split to be opened sufficiently for the assembly to be slid transversely over a shaft (not shown). When in position on the shaft the casing members are engaged in a recess in the body through which the shaft extends so as to maintain the sealing ring in circular form with its edge 14 bearing on the shaft.

As thus described with reference to the drawings the sealing ring is of known construction. In accordance with the invention, however, the extremities of the inner flange 13 at the split are connected to the radially-outer flange, remotely from the split, by webs 19 and 20 which are integral with the rubber ring. In this way, when the sealing ring is closed about the shaft the resultant outward radial pressure acting on the rubber ring will cause the webs 19 and 20 to hinge about their radially-outer ends or forcing the said extremities of the radially-inner flange circumferentially towards each other to hold the split closed in that position.

As shown in FIGURE 1, the rubber ring can be provided with other integral webs which are circumferentially spaced in the channel of the rubber ring. These additional webs 22 form two oppositely-directed series which meet at a point 23 opposite the space 18. It will be seen that these webs 22 progressively urge the flange 13 circumferentially towards the split 15 as the sealing ring is closed about the shaft.

Figure 3:
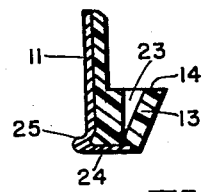
FIGURE 3 is a cross-section on the line 3—3 of FIGURE 2.

It will be seen from FIGURE 3 that each of the metal casing members is provided with a radially-inwardly directed flange 24 joined to it by a beading 25. This flange and beading not only act to add strength to the said members, but the flanges 24 of the two casing members enable the latter to be placed accurately in a mould while the rubber ring is being moulded, and their respective bearings 25 will by abutting a planar marginal surface round the recess into which the sealing ring is to be inserted, ensure that the sealing edge 14 shall lie in a plane at right-angles to the axis of the shaft to be sealed.

What I claim as my invention and desire to secure by Letters Patent of the United States is:

1. A shaft sealing ring comprising a ring of sealing material, said ring of sealing material substantially of U cross-section to provide radially-inner and radially-outer flanges separated by a channel, the radially-inner flange providing a lip adapted for sealing engagement with a shaft, at least two rigid arcuate members fast with said radially-outer flange, said arcuate members being spaced from each other circumferentially of said radially-outer flange, said ring of sealing material being split in a position intermediate adjacent ends of two adjacent said arcuate rigid members, and said ring of sealing material formed interiorly of the channel at each side of the split with an integral web connecting the extremity at the split of said radially-inner flange to a portion of said radially-outer flange which is circumferentially spaced from the split.

2. A shaft sealing ring comprising a ring of sealing material, said ring of sealing material substantially of U cross-section to provide radially-inner and radially-outer flanges separated by a channel, the radially-inner flange providing a lip adapted for sealing engagement with a shaft, at least two rigid arcuate members fast with said radially-outer flange, said arcuate members being spaced from each other circumferentially of said radially-outer flange, said ring of sealing material being split in a position intermediate adjacent ends of two adjacent said arcuate rigid members, and said ring of sealing material formed interiorly of the channel at each side of the split with an integral straight web connecting the extremity at the split of said radially-inner flange to a portion of said radially-outer flange which is circumferentially spaced from the split, said straight webs making equal angles with the plane of the split at opposite sides of the latter.

3. A shaft sealing ring comprising a ring of sealing material, said ring of sealing material substantially of U cross-section to provide radially-inner and radially-outer flanges separated by a channel, the radially-inner flange providing a lip adapted for sealing engagement with a shaft, at least two rigid arcuate members fast with said radially-outer flange, said arcuate members being spaced from each other circumferentially of said radially-outer flange, said ring of sealing material being split in a position intermediate adjacent ends of two adjacent said arcuate rigid members, said ring of sealing material formed interiorly of the channel at each side of the split with an integral web connecting the extremity at the split of said radially-inner flange to a portion of said radially-outer flange which is circumferentially spaced from the split, and said ring of sealing material formed interiorly of the channel with circumferentially spaced additional integral webs interconnecting said radially-inner flange to said radially-outer flange, said additional webs adapted to displace said lip of said radially-inner flange circumferentially towards the split from a diametrically-opposite point of said ring of sealing material when said sealing ring is closed about the shaft.

4. A shaft sealing ring comprising a ring of sealing material, said ring of sealing material substantially of U cross-section to provide radially-inner and radially-outer flanges separated by a channel, the radially-inner flange providing a lip adapted for sealing engagement with a shaft, at least two rigid arcuate members fast with said radially-outer flange, said arcuate members being spaced from each other circumferentially of said radially-outer flange, said rigid arcuate members provided externally with coplanar radially-extending marginal portions adapted to abut a plane surface in a body in which the shaft is to be sealed, said plane surface at right-angles to the shaft axis, where by to ensure that said lip of said radially-inner flange will lie in plane normal to the shaft axis, said ring of sealing material being split in a position intermediate adjacent ends of two adjacent said arcuate rigid members, and said ring of sealing material formed interiorly of the channel at each side of the split with an integral web connecting the extremity at the split of said radially-inner flange to a portion of said radially-outer flange which is circumferentially spaced from the split.

5. A shaft sealing ring comprising a ring of sealing material, said ring of sealing material substantially of U cross-section to provide radially-inner and radially-outer flanges separated by a channel, the radially-inner flange providing a lip adapted for sealing engagement with a shaft, at least two rigid arcuate members fast with said radially-outer flange, said arcuate members being spaced from each other circumferentially of said radially-outer flange, said rigid arcuate members provided externally with coplanar radially-extending marginal portions adapted to abut a plane surface in a body in which the shaft is to be sealed, said plane surface at right-angles to the shaft axis, whereby to ensure that said lip of said radially-inner flange will lie in plane normal to the shaft axis, said ring of sealing material being split in a position intermediate adjacent ends of two adjacent said arcuate rigid members, said ring of sealing material formed interiorly of the channel at each side of the split with an integral straight web connecting the extremity at the split of said radially-inner flange to a portion of said radially-outer flange which is circumferentially spaced from the split, said straight webs making equal angles with the plane of the split at opposite sides of the latter, and said ring of sealing material formed interiorly of the channel with circumferentially spaced additional integral webs interconnecting said radially-inner flange to said radially-outer flange, said additional webs adapted to displace said lip of said radially-inner flange circumferentially towards the split from a diametrically-opposite point of said ring of sealing material when said sealing ring is closed about the shaft.

References Cited in the file of this patent
UNITED STATES PATENTS

| | | |
|---|---|---|
| 1,359,170 | Hatfield | Nov. 16, 1920 |
| 1,582,562 | Vogel | Apr. 27, 1926 |
| 2,465,175 | Schwarz et al. | Mar. 22, 1946 |
| 2,926,938 | Ratti | Mar. 1, 1960 |